UNITED STATES PATENT OFFICE.

CARL WALTER VOLNEY, OF NEW YORK, N. Y.

GUNPOWDER.

SPECIFICATION forming part of Letters Patent No. 592,895, dated November 2, 1897.

Application filed March 3, 1897. Serial No. 625,880. (No specimens.)

*To all whom it may concern:*

Be it known that I, CARL WALTER VOLNEY, a citizen of the United States, residing at New York, in the county and State of New York, have invented certain new and useful Improvements in Gunpowder; and I declare that in the following I fully and correctly describe my invention, so that those skilled in the art to which it appertains can make and use the same.

The purpose of my invention is the production of a gunpowder consisting of nitrocellulose, trinitrobenzene, and basic rosanilin. It is for this purpose necessary that these substances be dissolved and that the solutions be intimately commingled and dissolved with each other, so that a perfectly homogeneous mass may be ultimately obtained from which gunpowder of uniform ballistic and other desirable qualities may be prepared.

It is well known that the trinitro compounds of benzene, toluene, and xylene are remarkable for stability and lack of solubility in water, ether, alcohol, and other solvents. I have found that solution of these bodies in alcohol, acetone, and other volatile liquids may be effected if the liquids are kept at a higher temperature and pressure, and that the solution thus once effected may be cooled down without separating therefrom the trinitro compounds. These solutions can be obtained at a temperature of 90° to 100° centigrade under a pressure of about one atmosphere over the ordinary atmospheric pressure. If these solutions are mixed with solutions of guncotton or nitrocellulose in acetone or other suitable solvents and evaporated, homogeneous hard masses are obtained, which I use for the manufacture of gunpowder; and as it is desirable to have present in the compound a substance of a basic character fit to neutralize any acid reaction, which substance should have in common with nitrocellulose and trinitrobenzene the quality of insolubility in water and which at the same time may regulate the burning of the powder, I add a certain amount of basic rosanilin to the solution of the before-named substances. The thus-produced compound, consisting of trinitrobenzene, nitrocellulose, and basic rosanilin, possesses in itself almost entirely the elements of perfect combustion, and is distinguished by the anhydrous character of all substances contained therein and their stability, and that none are in any degree volatile. Guncotton, trinitrobenzene, and basic rosanilin are insoluble in water, and especially the trinitrobenzene and the rosanilin are not affected by any changes of temperature to which gunpowder may be exposed ordinarily.

The three substances which I use in the composition of my gunpowder form, therefore, a body of great stability and indifference to changes of temperature and atmosphere and offer at the same time advantages in manufacture by the freedom from danger and change of constitution.

To make the powder composition, I first prepare the solution of trinitrobenzene in a suitable volatile solvent. As a higher temperature is necessary for the process, it is performed in an autoclave vessel of iron or copper provided with the necessary openings, faucets, safety-valve, and pressure-gage, and a stirring apparatus. One part of trinitrobenzol will therein be dissolved in five or six parts of acetone or methylic alcohol. When the solid trinitrobenzene is dissolved, the vessel is cooled down to about 35° centigrade and the solution transferred to a closed vessel containing a solution of the necessary amount of nitrocellulose and rosanilin and intimately mixed therewith, and after removal of excess of solvent the remaining plastic mass is treated in the usual way, as practiced in the manufacture of gunpowder from dissolved or plastic nitrocellulose compounds. The proportions in which the substances forming the compound may be more or less changed, so that powders may thereby be produced which show differences in physical as well as in ballistic qualities. In this respect it may be observed that an increase in the quantity of the basic rosanilin tends to retard the burning of the powder.

It is feasible to incorporate into the mixture of the described solutions oxidizing agents or inert matter which are in solution or in a finely pulverulent state.

As a general example of composition for a gunpowder of the class herein described I give the following quantities to be dissolved and treated as set forth: Forty parts of trinitrobenzene are dissolved in acetone, as described, and then mixed with a solution of fifty-five parts of nitrocellulose and five parts of basic rosanilin. The compound will yield one hundred parts of powder.

The trinitro compounds of toluene and xylene may be similarly used, as I have described, for the benzene compound. However, they dissolve in suitable volatile solvents only sparingly, and owing to their chemical constitution the powder prepared with them has not the free-burning qualities of the trinitrobenzene powder which I have therefore preferred to use.

Having described my invention, what I desire to secure by Letters Patent is—

A gunpowder, consisting of nitrocellulose and basic rosanilin and trinitrobenzene, as herein described.

CARL WALTER VOLNEY.

Witnesses:
C. A. GRAHAM,
H. DUNCAN WOOD.